Figure 1:
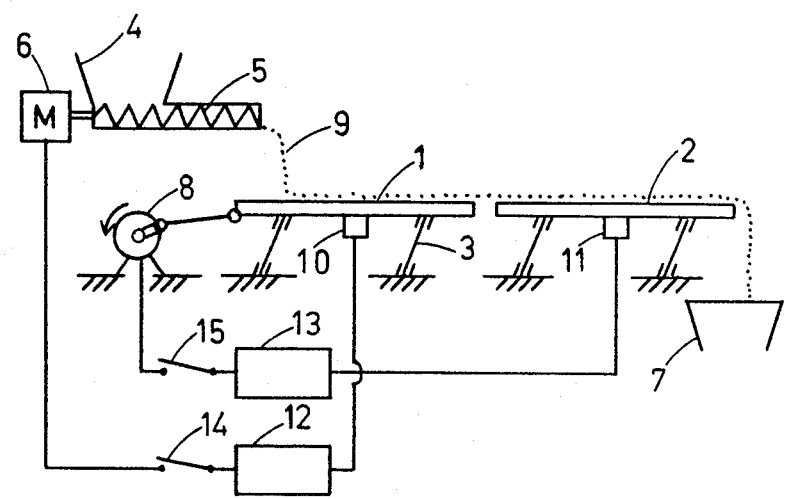

United States Patent [19]

Cabi-Akman

[11] Patent Number: 4,513,882
[45] Date of Patent: Apr. 30, 1985

[54] CONTINUOUS TRANSPORT METHOD AND APPARATUS

[75] Inventor: Robert Cabi-Akman, Chavannes, Switzerland

[73] Assignee: Nestec, S.A., Vevey, Switzerland

[21] Appl. No.: 396,760

[22] Filed: Jul. 9, 1982

[30] Foreign Application Priority Data

Jul. 23, 1981 [CH] Switzerland ............... 4804/81

[51] Int. Cl.³ .............................................. B67D 5/08
[52] U.S. Cl. ....................................... 222/56; 222/63; 177/DIG. 11; 198/571
[58] Field of Search ............... 222/56, 57, 52, 77, 222/200, 243, 196, 55, 63; 177/DIG. 11, 60, 82; 198/571, 572; 241/33, 34; 318/127, 128, 114

[56] References Cited

U.S. PATENT DOCUMENTS

| | | | |
|---|---|---|---|
| 2,626,042 | 1/1953 | Aldridge | 177/DIG. 11 |
| 2,766,939 | 10/1956 | Weston | 222/52 |
| 3,158,291 | 11/1964 | Lytton et al. | 222/56 |
| 3,494,507 | 2/1970 | Ricciardi | 222/56 |
| 3,645,305 | 2/1972 | Warlop | 222/56 |
| 4,002,270 | 1/1977 | Reiner | 222/63 |

FOREIGN PATENT DOCUMENTS 505442 4/1978 U.S.S.R. ............... 177/DIG. 11

Primary Examiner—Joseph J. Rolla
Assistant Examiner—Kenneth Noland
Attorney, Agent, or Firm—Vogt & O'Donnell

[57] ABSTRACT

A particulate product is transported on at least one tray vibrated at a pre-determined basic frequency. A product overload on the tray is avoided by monitoring its vibrations and detecting whether the amplitude of at least one harmonic sensitive to the load does or does not exceed a predetermined critical threshold.

9 Claims, 2 Drawing Figures

CONTINUOUS TRANSPORT METHOD AND APPARATUS

The present invention provides a continuous transport method, in which a particulate product is transported along at least one tray vibrated at a determined basic frequency.

This invention also provides a continuous transport apparatus, comprising at least one vibrating tray for the transport of a particulate product.

Jamming which blocks the flow of a particulate product is often to be feared in continuous transport apparatus which comprises at least one vibrating tray. Such a jam is to be feared, for example, when the particulate product becomes locally attached to the surface of the tray and forms a barrier behind which the product accumulates. Unless the barrier is rapidly reabsorbed or removed, the product which has accumulated behind it may in turn become attached, the phenomenon may spread and finally produce a jam which completely blocks the flow of product.

The object of the present invention is to eliminate the jamming problem.

For this purpose, the method of the present invention is characterised in that a product overload on at least one tray is avoided by monitoring its vibrations and detecting whether the amplitude of at least one harmonic sensitive to the load does or does not exceed at least one predetermined crictical threshold.

Likewise, the apparatus according to the present invention is characterised in that it comprises a device for monitoring the vibrations of at least one tray detecting whether the amplitude of at least one harmonic sensitive to the load does or does not exceed at least one predetermined critical threshold. The device for monitoring the vibrations preferably comprises at least one electromechanical means attached to the tray for measuring the vibrations electrically connected to at least one electronic filtration and comparison circuit connected electrically to at least one circuit breaker.

It has been found that certain harmonics of the basic vibrations or oscillations of a tray which is vibrated at a pre-determined basic (imposed) frequency are sensitive to the product load on the tray. A direct and practical possibility was seen therein for permanently monitoring the load of a tray which is exposed to the risk of jamming, and for automatically intervening before the phenomenon of local attachment and accumulation of product spreads to such an extent that a blockage or jam results.

In order to implement the present method, it is possible to first of all determine which harmonics are particularly sensitive to the load on the tray or trays. This sensitivity will depend on the type of vibrating tray and on the characteristics of the equipment. The occurrence of the harmonics is in fact itself due to defects in the vibrating system which necessarily vary from one type to another. However, it has been confirmed that it is virtually always possible to select one or more harmonics which are suitable, in particular from among harmonics 6 to 12. It is also possible to monitor the sum of the amplitudes of several harmonics which are sensitive to the tray load. The automatic switching on and/or off of an alarm, for example an optical or acoustic alarm is preferably provided when the amplitude exceeds a first critical threshold or returns below this threshold. Likewise, automatic stop or re-start of the line or the feed of product to the tray may be provided, or diversion or return of the product flow may be provided when the amplitude exceeds a second critical threshold or returns on below this threshold.

The levels of the first and second thresholds may be determined by preliminary tests which will indicate the load from which the risk of a blockage occurring on a given tray exists for a specific product and under particular transport conditions.

Figure 2:
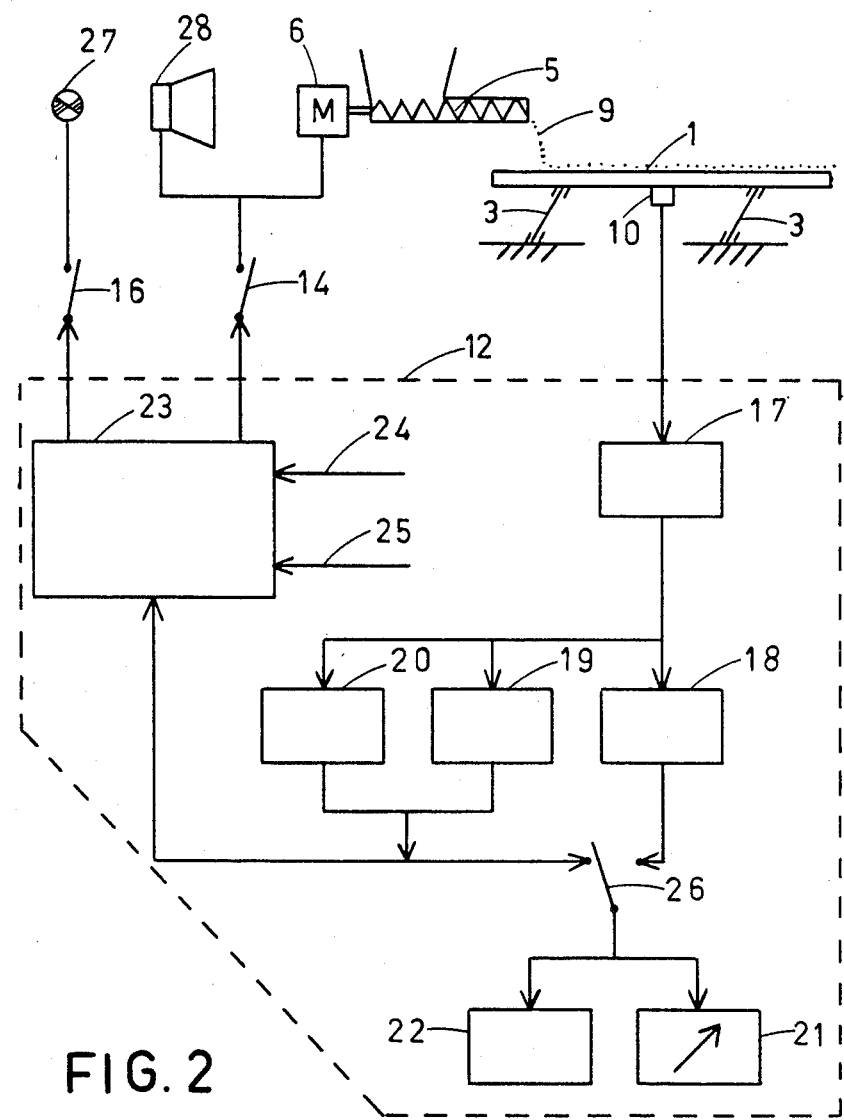

The apparatus according to the present invention is described in more detail below with reference to the accompanying drawings which are provided by way of example, and in which FIG. 1 is an outline diagram showing one embodiment of the apparatus, and FIG. 2 is a block diagram of one embodiment of the device for monitoring the vibrations.

The apparatus which is schematically illustrated in FIG. 1 comprises one or more lines which each comprise two successive vibrating trays, designated by reference numerals 1 and 2, and mounted on oblique leaf springs 3. For each line, the apparatus has at least one inlet hopper 4 feeding a screw conveyor 5 which is driven by a motor 6, and the apparatus also has an outlet hopper 7. The trays 1 and 2 are each vibrated by a vibrator 8 which is only shown for the first tray.

In the embodiment illustrated in FIG. 1, the apparatus comprises a device 10 to 15, for monitoring the vibrations of the two trays, detecting whether the amplitude of at least one harmonic sensitive to the load of the particular product 9 on said plates does or does not exceed at least one determined critical threshold. The monitoring device which is shown comprises electromechanical means 10 and 11 for measuring vibrations, attached to the said trays 1 and 2 and are each electrically connected to an electronic filtration and comparison circuit 12 and 13 each of which is electrically connected to at least one circuit breaker 14, resp. 15. The circuit breakers 14 and 15 which are illustrated in this case control the respective feed means of the trays 1 and 2, i.e., circuit breaker 14 controls via the motor 6 the feed conveyor 5 for the supply of product to the first tray and circuit breaker 15 controls by means of its vibrator 8 the first tray itself for the supply of product to the second plate.

FIG. 2 is a block diagram of one embodiment of the device for monitoring vibrations, which is of the same type as the one illustrated in FIG. 1 for tray 1. This device for monitoring the vibrations comprises an electromechanical means 10 for measuring the vibrations, in this case a piezo-resistive accelerometer which is connected to an electronic filtration and comparison circuit 12, which in turn is connected to two circuit breakers 14 and 16. The filtration and comparison circuit 12 comprises a converter 17 and band-pass and rectifier filters, i.e., one filter 18 for the basic frequency, in this case 60 Hz, and two filters 19 and 20 for the harmonics, in this case the harmonics 6 (360 Hz) and 8 to 12 (480–720 Hz) which lie on each side of the natural frequency of the accelerometer 10. The circuit 12 also comprises a galvanometer 21 and a recorder 22 for the calibration, recording and readout of the basic frequency, a comparator 23 for comparing the sum of the amplitudes of the harmonics with a first and a second critical threshold which are fed into and retained in the comparator through respective inputs 24 and 25, and a commutator 26 for displaying the harmonics and for the calibration of the comparator 23. The circuit breaker 16 controls an optical alarm 27 in response to the result of the comparison with the first threshold 24. The circuit breaker 14 controls the motor 6 of the screw 5 for feeding product 9 to the tray 1, and it also controls an acoustic alarm 28 according to the result of the comparison with the second threshold 25.

A more detailed description will now be provided of the operation of the electronic filtration and comparison circuit 12 which is illustrated in FIG. 2. In this circuit, the purpose of the converter 17 is to amplify and calibrate the alternating signal emitted by the accelerometer 10. The amplified and calibrated signal is divided and directed to the three band-pass and rectifier filters 18, 19 and 20. The filter 18 selects the basic frequency at which the tray is vibrated, i.e., in this case 60 Hz, and it rectifies this frequency in order to obtain a direct voltage which is proportional to the amplitude of the basic mechanical vibration or oscillation of the tray 1, a voltage which may be shown by the galvanometer 21 and may be recorded on the recorder 22. The accelerometer 10 used in this example has its own frequency and thus enters into mechanical resonance at a frequency approaching the 7th harmonic of the basic, i.e., towards 420 Hz, and for this reason this frequency is not considered. The 6th harmonic is selected by the filter 19 and harmonics 8 to 12 are selected by filter 20, all the harmonics greater than 5 having generally proved to be sensitive to the load of the tray, with harmonics 6 to 12 being particularly significant and useful for the present objective. Thus, the filters 19 and 20 select their respective frequencies and rectify them. Filter 19 provides a direct voltage proportional to the amplitude of the 6th harmonic, filter 20 provides a direct voltage proportional to the total of the amplitudes of harmonics 8 to 12 and these two voltages are added together to provide a single direct voltage which is responsive to the load of the tray 1. This voltage, which may also be shown by the galvanometer 21, is directed to the comparator 23 where it is compared with two registered voltages or critical thresholds which have been introduced into the comparator through the inputs 24 and 25. These critical thresholds have been determined and fixed on the basis of the results of preliminary tests, indicating the load level beyond which the tray 1 is exposed to the risk of jamming for a given particulate product and under specific transport conditions of the product.

The apparatus which has been described above by way of example can thus react immediately and automatically as soon as the risk of jamming arises on the trays 1 and 2. This reaction is signalled by operation of the optical alarm 27 when a first critical threshold is approached, which signifies a potential risk of jamming, and then by switching on the acoustic alarm 28 and immediately stopping product supply to the affected tray when a jam is developing. Depending on the type of apparatus, it is also possible to provide for immediate shut-down of the complete line or diversion of the flow of product instead of only stopping product supply to the affected tray. On the other hand, the alarms 27 and 28 close and normal operating conditions (product supply to the affected tray or the whole line, or product feed rate) are restored automatically when the risk of jamming has abated sufficiently or when the beginnings of a jam have been reabsorbed or eliminated.

I claim:

1. A continuous transport method which detects overloads on a tray, comprising the steps of supplying a particulate product to the tray, transporting a particulate product along the tray by vibrating the tray at a pre-determined basic frequency, and detecting an incipient product overload on the tray by monitoring the vibrations of the tray and comparing with a pre-determined critical threshold the amplitude of at least one harmonic of said basic frequency, which harmonic is sensitive to the load on the tray.

2. A method according to claim 1, wherein the amplitude of at least one of the sixth to twelfth harmonics of said basic frequency is monitored and compared with said critical threshold.

3. A method according to claim 1, wherein the sum of the amplitudes of several harmonics of said basic frequency which harmonics are sensitive to the load of the tray is monitored and compared with said critical threshold.

4. A method according to claim 1 further comprising the steps of switching an alarm on when said amplitude exceeds said threshold and switching the alarm off when said amplitude returns below said threshold.

5. A method according to claim 1, further comprising the step of interrupting the product supply to the tray when said amplitude exceeds said critical threshold, and restoring such supply when said amplitude returns below said threshold.

6. A continuous transport apparatus capable of overload detection, comprising a tray for the transport of a particulate product, means for vibrating the tray at a pre-determined basic frequency and means for detecting an incipient product overload tray by monitoring the vibrations of said tray and comparing with a pre-determined critical threshold the amplitude of at least one harmonic of said basic frequency which harmonic is sensitive to the load on said tray.

7. An apparatus according to claim 6, wherein the means for monitoring and comparing includes electromechanical means attached to the tray, and an electronic filtration and comparison circuit connected electrically to said electromechanical means.

8. An apparatus according to claim 6, further comprising an alarm, said means for monitoring and comparing being operative to activate said alarm when said amplitude exceeds said threshold.

9. An apparatus according to claim 6, further comprising means responsive to said monitoring and comparing means for interrupting the product flow to the tray.

* * * * *

UNITED STATES PATENT AND TRADEMARK OFFICE
CERTIFICATE OF CORRECTION

PATENT NO. : 4,513,882
DATED : April 30, 1985
INVENTOR(S) : Robert Cabi-Akman

It is certified that error appears in the above—identified patent and that said Letters Patent is hereby corrected as shown below:

Column 4, Claim 6, line 40, "overload tray" should read --overload on the tray--.

Signed and Sealed this

Third Day of September 1985

[SEAL]

*Attest:*

DONALD J. QUIGG

*Attesting Officer*  Acting Commissioner of Patents and Trademarks - Designate